(12) United States Patent
Holmberg

(10) Patent No.: US 8,045,038 B2
(45) Date of Patent: Oct. 25, 2011

(54) VIDEO CAMERA WITH MOUNT

(76) Inventor: Larry Holmberg, Gully, MN (US)

( * ) Notice: Subject to any disclaimer, the term of this patent is extended or adjusted under 35 U.S.C. 154(b) by 133 days.

(21) Appl. No.: 12/571,641

(22) Filed: Oct. 1, 2009

(65) Prior Publication Data

US 2010/0066899 A1 Mar. 18, 2010

Related U.S. Application Data

(60) Continuation of application No. 10/804,548, filed on Mar. 18, 2004, now Pat. No. 7,619,676, which is a continuation of application No. 10/179,603, filed on Jun. 25, 2002, now Pat. No. 7,006,144, which is a division of application No. 09/264,587, filed on Mar. 8, 1999, now Pat. No. 6,556,245.

(51) Int. Cl.
*H04N 5/222* (2006.01)

(52) U.S. Cl. .............................. 348/333.06; 348/207.99

(58) Field of Classification Search ............. 348/207.99, 348/373–376, 82, 333.01, 333.06; 124/23.1, 124/87–88; 396/420, 429
See application file for complete search history.

(56) References Cited

U.S. PATENT DOCUMENTS

| | | | |
|---|---|---|---|
| 521,761 A | 6/1894 | Day |
| 547,912 A | 10/1895 | Crupe |
| 619,214 A | 2/1899 | Paul |
| 674,229 A | 5/1901 | Windle |
| 845,165 A | 2/1907 | Davis |
| 899,639 A | 9/1908 | Vibber |
| 1,452,651 A | 4/1923 | Norrlin |
| 1,480,147 A | 1/1924 | Brandt |
| 2,101,479 A | 12/1937 | Schenk |
| 2,450,466 A | 10/1948 | Carlson |
| 2,483,711 A | 10/1949 | Roos |
| 2,664,797 A | 1/1954 | Thrasher |
| 2,814,118 A | 11/1957 | Evans et al. |
| 3,062,114 A | 11/1962 | Palos |
| 3,065,666 A | 11/1962 | Sampson |
| 3,427,102 A | 2/1969 | Wade |
| 3,483,623 A | 12/1969 | Kruzell |
| 3,545,356 A | 12/1970 | Nielsen |
| 3,684,376 A | 8/1972 | Lessard |
| 3,684,378 A | 8/1972 | Lord |
| 3,737,232 A | 6/1973 | Millburn, Jr. |
| 3,782,822 A | 1/1974 | Spence |

(Continued)

FOREIGN PATENT DOCUMENTS

EP 1804017 A1 7/2007

(Continued)

OTHER PUBLICATIONS

Improved Construction Methods, "Laser Measuring System, Impulse LX", http://www.improvedconstructionmethods.com/impulse_xl.htm.

(Continued)

*Primary Examiner* — Tuan Ho
(74) *Attorney, Agent, or Firm* — Kinney & Lange, P.A.

(57) ABSTRACT

A camera for mounting to a weapon includes a housing, a camera lens, a video recorder, a cover, and a mounting rail. The camera lens is located at a front end of the housing. The video recorder is located within the housing for recording images captured by the camera lens. The cover is coupled to a rear end of the housing for accessing components located within the housing and the mounting rail extends along an exterior surface of the housing and mounts the camera to the weapon.

20 Claims, 18 Drawing Sheets

U.S. PATENT DOCUMENTS

| | | |
|---|---|---|
| 3,785,261 A | 1/1974 | Ganteaume |
| 3,834,052 A | 9/1974 | Steck, III |
| 4,000,403 A | 12/1976 | Rice |
| 4,026,054 A | 5/1977 | Snyder |
| 4,027,414 A | 6/1977 | Felix |
| 4,069,414 A | 1/1978 | Bell |
| 4,162,696 A | 7/1979 | Sprung |
| 4,223,770 A | 9/1980 | Kranz |
| 4,281,343 A | 7/1981 | Monteiro |
| 4,283,743 A | 8/1981 | Kaiser |
| T101,001 I4 | 9/1981 | Shipp et al. |
| 4,296,725 A | 10/1981 | Broderick |
| 4,309,095 A | 1/1982 | Buckley |
| 4,312,580 A | 1/1982 | Schwomma et al. |
| D268,910 S | 5/1983 | Shipp et al. |
| 4,439,032 A | 3/1984 | Congdon |
| 4,514,907 A | 5/1985 | Saltzman |
| 4,516,296 A | 5/1985 | Sherman |
| 4,531,052 A | 7/1985 | Moore |
| 4,561,204 A | 12/1985 | Binion |
| 4,564,322 A | 1/1986 | Stapley |
| 4,597,211 A | 7/1986 | Miles |
| 4,606,629 A | 8/1986 | Hines et al. |
| 4,617,741 A | 10/1986 | Bordeaux et al. |
| 4,640,258 A | 2/1987 | Penney et al. |
| 4,643,159 A | 2/1987 | Ryan |
| 4,730,190 A | 3/1988 | Win et al. |
| 4,753,528 A | 6/1988 | Hines et al. |
| 4,777,352 A | 10/1988 | Moore |
| 4,786,204 A | 11/1988 | Mayeda |
| 4,786,966 A | 11/1988 | Hanson et al. |
| 4,827,348 A | 5/1989 | Ernest et al. |
| 4,835,621 A | 5/1989 | Black |
| 4,884,137 A | 11/1989 | Hanson et al. |
| 4,890,128 A | 12/1989 | Kania |
| 4,907,567 A | 3/1990 | Henrich |
| 4,910,717 A | 3/1990 | Terry |
| 4,939,863 A | 7/1990 | Alexander et al. |
| 4,970,589 A | 11/1990 | Hanson et al. |
| 4,974,575 A | 12/1990 | Mitchell |
| D313,361 S | 1/1991 | Robinson |
| 4,993,833 A | 2/1991 | Lorey et al. |
| 4,996,866 A | 3/1991 | Masera et al. |
| 5,005,213 A | 4/1991 | Hanson et al. |
| 5,020,262 A | 6/1991 | Pena |
| 5,026,158 A | 6/1991 | Golubic |
| 5,033,219 A | 7/1991 | Johnson et al. |
| 5,068,720 A | 11/1991 | Herlitz et al. |
| 5,161,310 A | 11/1992 | Stoot |
| 5,200,827 A | 4/1993 | Hanson et al. |
| 5,262,837 A | 11/1993 | Shyy |
| 5,265,896 A | 11/1993 | Kravitz |
| 5,294,988 A | 3/1994 | Wakabayashi et al. |
| 5,297,533 A | 3/1994 | Cook |
| 5,326,061 A | 7/1994 | Hamilton |
| 5,339,793 A | 8/1994 | Findley |
| 5,373,657 A | 12/1994 | Betz et al. |
| 5,418,609 A | 5/1995 | Dunne |
| 5,455,625 A | 10/1995 | Englander |
| 5,456,157 A | 10/1995 | Lougheed et al. |
| 5,479,712 A | 1/1996 | Hargrove et al. |
| 5,507,272 A | 4/1996 | Scantlen |
| 5,520,164 A | 5/1996 | Huddleston |
| D371,084 S | 6/1996 | Ogawa |
| 5,531,149 A | 7/1996 | Schubert et al. |
| 5,555,665 A | 9/1996 | Fore |
| 5,575,072 A | 11/1996 | Eldridge |
| 5,606,818 A | 3/1997 | Hardee |
| 5,611,324 A | 3/1997 | Kursinsky |
| 5,669,147 A | 9/1997 | Nakajima et al. |
| 5,669,174 A | 9/1997 | Teetzel |
| 5,686,690 A | 11/1997 | Lougheed et al. |
| 5,687,910 A | 11/1997 | King |
| 5,711,104 A | 1/1998 | Schmitz |
| D390,483 S | 2/1998 | Zykan et al. |
| 5,739,859 A | 4/1998 | Hattori et al. |
| 5,815,251 A | 9/1998 | Ehbets et al. |
| 5,822,621 A | 10/1998 | Szajewski |
| 5,831,718 A | 11/1998 | Desai et al. |
| 5,834,676 A | 11/1998 | Elliott |
| 5,845,165 A | 12/1998 | McMahan |
| 5,859,693 A | 1/1999 | Dunne et al. |
| 5,887,375 A | 3/1999 | Watson |
| 5,892,617 A | 4/1999 | Wallace |
| 5,895,131 A | 4/1999 | Yano |
| 5,911,215 A | 6/1999 | Fisher, Jr. |
| 5,926,260 A | 7/1999 | Dunne et al. |
| 5,937,562 A | 8/1999 | Brough |
| 5,944,041 A | 8/1999 | Kitchens |
| 5,949,529 A | 9/1999 | Dunne et al. |
| 5,964,054 A | 10/1999 | Galfidi, Jr. |
| 5,973,315 A | 10/1999 | Saldana et al. |
| 6,000,163 A | 12/1999 | Gordon |
| D421,229 S | 2/2000 | Imai |
| 6,029,643 A | 2/2000 | Golfieri |
| 6,070,355 A | 6/2000 | Day |
| 6,073,352 A | 6/2000 | Zykan et al. |
| D432,930 S | 10/2000 | Sanoner |
| 6,137,564 A | 10/2000 | Schmidt et al. |
| 6,154,971 A | 12/2000 | Perkins |
| 6,192,614 B1 | 2/2001 | Cliburn |
| 6,252,706 B1 | 6/2001 | Kaladgew |
| 6,269,581 B1 | 8/2001 | Groh |
| 6,286,796 B1 | 9/2001 | Pugliesi |
| 6,288,386 B1 | 9/2001 | Bowen et al. |
| 6,296,581 B1 | 10/2001 | Sever |
| 6,304,289 B1 | 10/2001 | Sakai et al. |
| 6,331,887 B1 | 12/2001 | Shiraishi et al. |
| 6,336,285 B1 | 1/2002 | Baumer |
| 6,341,201 B1 | 1/2002 | Ishiguro et al. |
| 6,396,571 B2 | 5/2002 | Ohtomo et al. |
| 6,397,483 B1 | 6/2002 | Perkins |
| 6,398,571 B1 | 6/2002 | Nishide et al. |
| 6,408,140 B1 | 6/2002 | Malloy Desormeaux |
| D460,367 S | 7/2002 | Apotheloz et al. |
| D460,368 S | 7/2002 | Apotheloz et al. |
| D460,369 S | 7/2002 | Apotheloz et al. |
| 6,425,697 B1 | 7/2002 | Potts et al. |
| 6,450,816 B1 | 9/2002 | Gerber |
| 6,487,809 B1 | 12/2002 | Gaber |
| 6,494,196 B2 | 12/2002 | Harwath et al. |
| 6,526,956 B1 | 3/2003 | Hankins |
| D472,826 S | 4/2003 | Sanoner |
| 6,556,245 B1 | 4/2003 | Holmberg |
| 6,598,331 B1 | 7/2003 | Thibodeaux |
| 6,615,531 B1 | 9/2003 | Holmberg |
| 6,623,182 B2 | 9/2003 | Tatera |
| 6,624,881 B2 | 9/2003 | Waibel et al. |
| 6,678,988 B1 | 1/2004 | Poff, Jr. |
| 6,681,755 B2 | 1/2004 | Pujos |
| 6,693,702 B2 | 2/2004 | Rogers |
| 6,704,097 B2 | 3/2004 | Waibel et al. |
| D488,315 S | 4/2004 | Natuzzi |
| 6,722,076 B2 | 4/2004 | Nielsen |
| 6,742,299 B2 | 6/2004 | Strand |
| 6,772,076 B2 | 8/2004 | Yamamoto et al. |
| 6,784,920 B2 | 8/2004 | Weber |
| 6,796,038 B2 | 9/2004 | Humphries |
| 6,813,025 B2 | 11/2004 | Edwards |
| 6,815,251 B1 | 11/2004 | Akram et al. |
| 6,819,495 B2 | 11/2004 | Shani et al. |
| 6,819,866 B2 | 11/2004 | Da Silva |
| 6,886,288 B1 | 5/2005 | Yocum et al. |
| 6,932,305 B2 | 8/2005 | Morales et al. |
| 6,988,331 B2 | 1/2006 | Holmberg |
| 7,002,620 B1 | 2/2006 | Rutledge |
| 7,006,144 B2 | 2/2006 | Holmberg |
| 7,088,506 B2 | 8/2006 | Regan et al. |
| 7,128,354 B2 | 10/2006 | Wu |
| 7,269,920 B2 | 9/2007 | Staley, III |
| 7,390,130 B2 | 6/2008 | Soulvie |
| 7,614,805 B2 | 11/2009 | Showalter |
| 7,789,574 B2 | 9/2010 | Broberg |
| 2002/0067475 A1 | 6/2002 | Waibel et al. |
| 2002/0078577 A1 | 6/2002 | Aldred |
| 2002/0087475 A1 | 7/2002 | Okayama et al. |
| 2002/0109057 A1 | 8/2002 | Wooten et al. |

| | | |
|---|---|---|
| 2002/0171755 A1 | 11/2002 | Nishimura |
| 2003/0013392 A1 | 1/2003 | Guillermin |
| 2003/0133092 A1 | 7/2003 | Rogers |
| 2003/0163943 A1 | 9/2003 | Holmberg |
| 2004/0000083 A1 | 1/2004 | Grant, Jr. |
| 2004/0016169 A1 | 1/2004 | Poff, Jr. |
| 2004/0051865 A1 | 3/2004 | Stierle et al. |
| 2004/0079018 A1 | 4/2004 | Holmberg |
| 2004/0114129 A1 | 6/2004 | Gogolla et al. |
| 2004/0135991 A1 | 7/2004 | Gogolla et al. |
| 2004/0183942 A1 | 9/2004 | Holmberg |
| 2004/0194364 A1 | 10/2004 | Holmberg |
| 2004/0257437 A1 | 12/2004 | Lesseu |
| 2005/0035245 A1 | 2/2005 | Morales et al. |
| 2005/0123883 A1 | 6/2005 | Kennen et al. |
| 2005/0195385 A1 | 9/2005 | Holmberg |
| 2005/0241210 A1 | 11/2005 | Karcher et al. |
| 2005/0246910 A1 | 11/2005 | Mowers |
| 2005/0252062 A1 | 11/2005 | Scrogin et al. |
| 2005/0268519 A1 | 12/2005 | Pikielny |
| 2005/0268521 A1 | 12/2005 | Cox et al. |
| 2006/0010761 A1 | 1/2006 | Staley, III |
| 2006/0215149 A1 | 9/2006 | LaBelle et al. |
| 2007/0008187 A1 | 1/2007 | Schmidt |
| 2007/0031142 A1 | 2/2007 | Moody et al. |
| 2007/0068018 A1 | 3/2007 | Gilmore |
| 2007/0081817 A1 | 4/2007 | Soulvie |
| 2007/0157502 A1 | 7/2007 | Holmberg |
| 2007/0157503 A1 | 7/2007 | Holmberg |
| 2007/0277421 A1 | 12/2007 | Perkins et al. |
| 2008/0000465 A1 | 1/2008 | Holmberg |
| 2008/0060248 A1 | 3/2008 | Pine et al. |

FOREIGN PATENT DOCUMENTS

| | | |
|---|---|---|
| GB | 2024558 A | 1/1980 |
| GB | 2114770 A | 8/1983 |
| WO | WO9012330 | 10/1990 |
| WO | WO2006090356 A1 | 8/2006 |
| WO | WO2006133029 A2 | 12/2006 |

OTHER PUBLICATIONS

"Specification Sheet on the Impulse 200 LR Laser (Rangefinder)," Nov. 15, 2003, Publisher: Laser Technology Inc.

VIDEO CAMERA WITH MOUNT

CROSS-REFERENCE TO RELATED APPLICATIONS

This is a continuation application of U.S. patent application Ser. No. 10/804,548 filed Mar. 18, 2004, titled "Camera Lens and Display", which is a continuation of application Ser. No. 10/179,603 filed Jun. 25, 2002, titled "Video Camera Recorder", now U.S. Pat. No. 7,006,144, which is a division of application of Ser. No. 09/264,587 filed Mar. 8, 1999, titled "Game Hunting Video Camera", now U.S. Pat. No. 6,556,245.

BACKGROUND

A motion picture camera attached to the barrel of a rife is disclosed in the U.S. Pat. No. 3,427102 (Wade). This invention is cumbersome to use and is only designed to be attached to an elongated barrel of a firearm. Moreover, its use requires the operator to physically change the structure of the firearm.

A gun mounted video camera is disclosed in U.S. Pat. No. 4,835,621 (Black). This patent discloses a device that looks like a rifle but is really just a video camera recording device.

Video cameras mounted to firearms with head mounted video displays are disclosed in the following patents: U.S. Pat. No. 4,786,966 (Hanson), U.S. Pat. No. 4,884,137 (Hanson), U.S. Pat. No. 4,970,589 (Hanson), U.S. Pat. No. 5,005,213 (Hanson), U.S. Pat. No. 5,200,827 (Hanson), U.S. Pat. No. 5,711,104 (Schmitz). A similar invention is disclosed in U.S. Pat. No. 5,834,676 (Elliot). These patents relate to using a video camera to transmit a video signal to a head mounted video display for aiming purposes and are generally designed for military or police purposes not for recording game hunting.

SUMMARY

An embodiment of the present invention is a camera for mounting to a weapon. The camera includes a housing and a camera lens, which is located at a front end of the housing. A video recorder is located within the housing for recording images captured by the camera lens. A cover is coupled to a rear end of the housing for accessing components located within the housing. A mounting rail extends along an exterior surface of the housing for mounting the camera to the weapon.

In another embodiment, a camera body has a lens at front end and a cover at the rear end. A video recorder is located within the camera body between the front and rear ends. A battery compartment is connected to the video recorder and a mounting rail extends along the camera body for mounting the camera to a weapon.

BRIEF DESCRIPTION OF THE DRAWINGS

The forgoing and other features and advantages will be apparent to those skilled in the art from the specification and the following illustrations of the preferred embodiments in which like reference numerals indicate like parts throughout the several views. Referring to the drawings.

DETAILED DESCRIPTION

Figure 1:
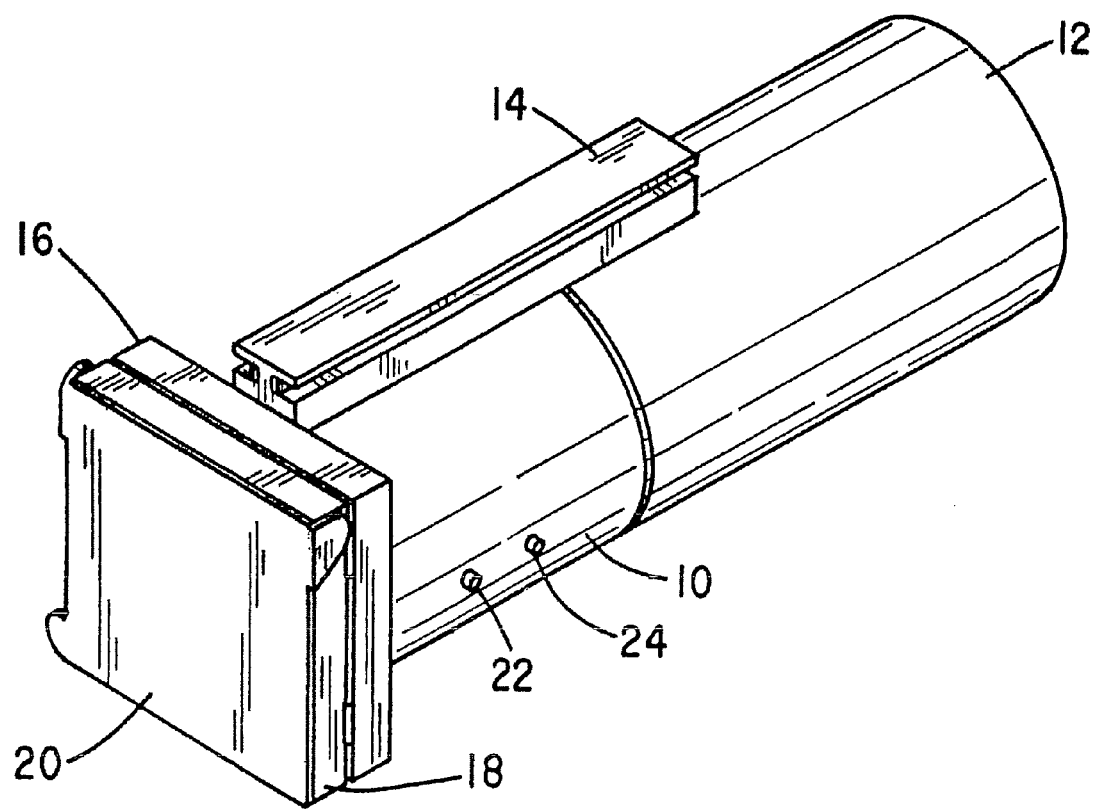
FIG. 1 is a perspective view of the first embodiment of the game hunting video camera in its non-operational mode.
Figure 2:
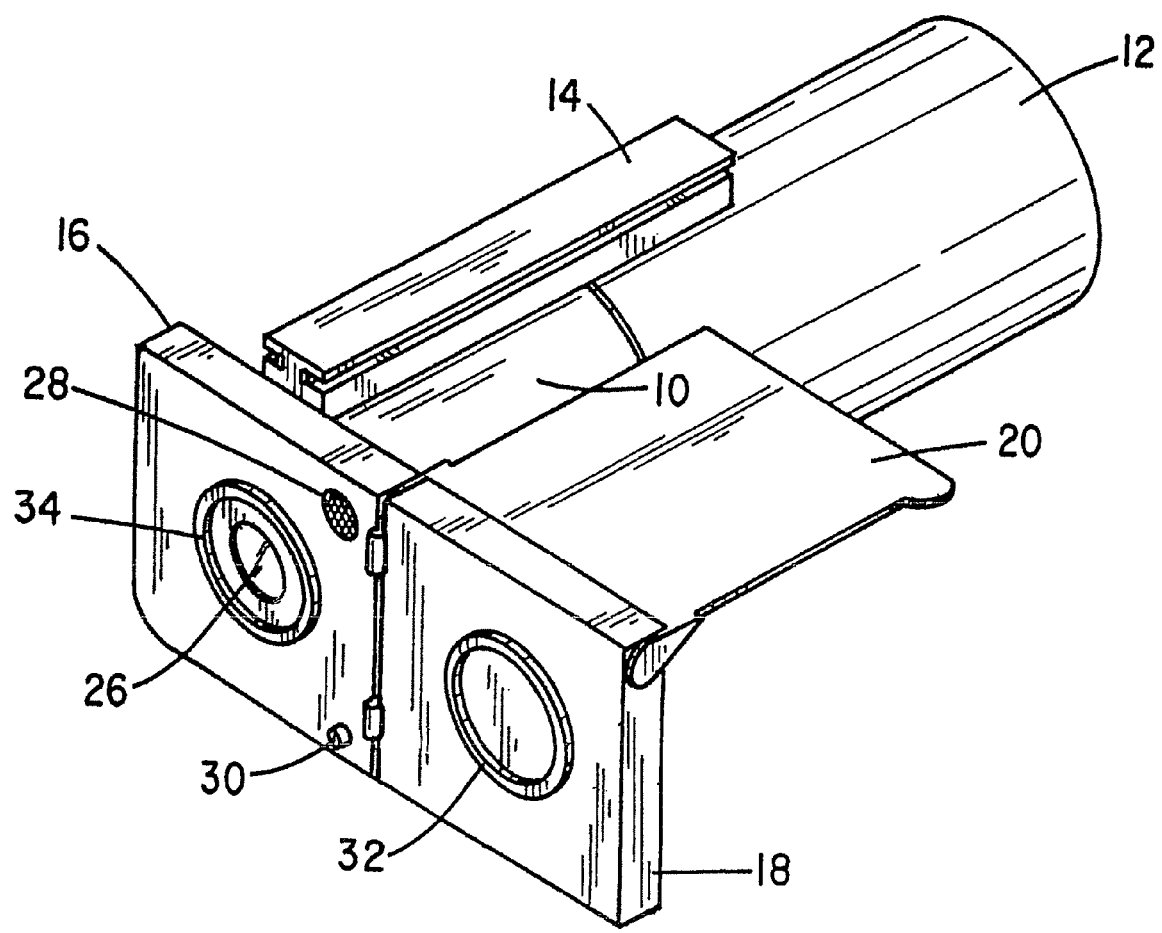
FIG. 2 is a perspective view of the first embodiment of the game hunting video camera in its operational mode.
Figure 3:
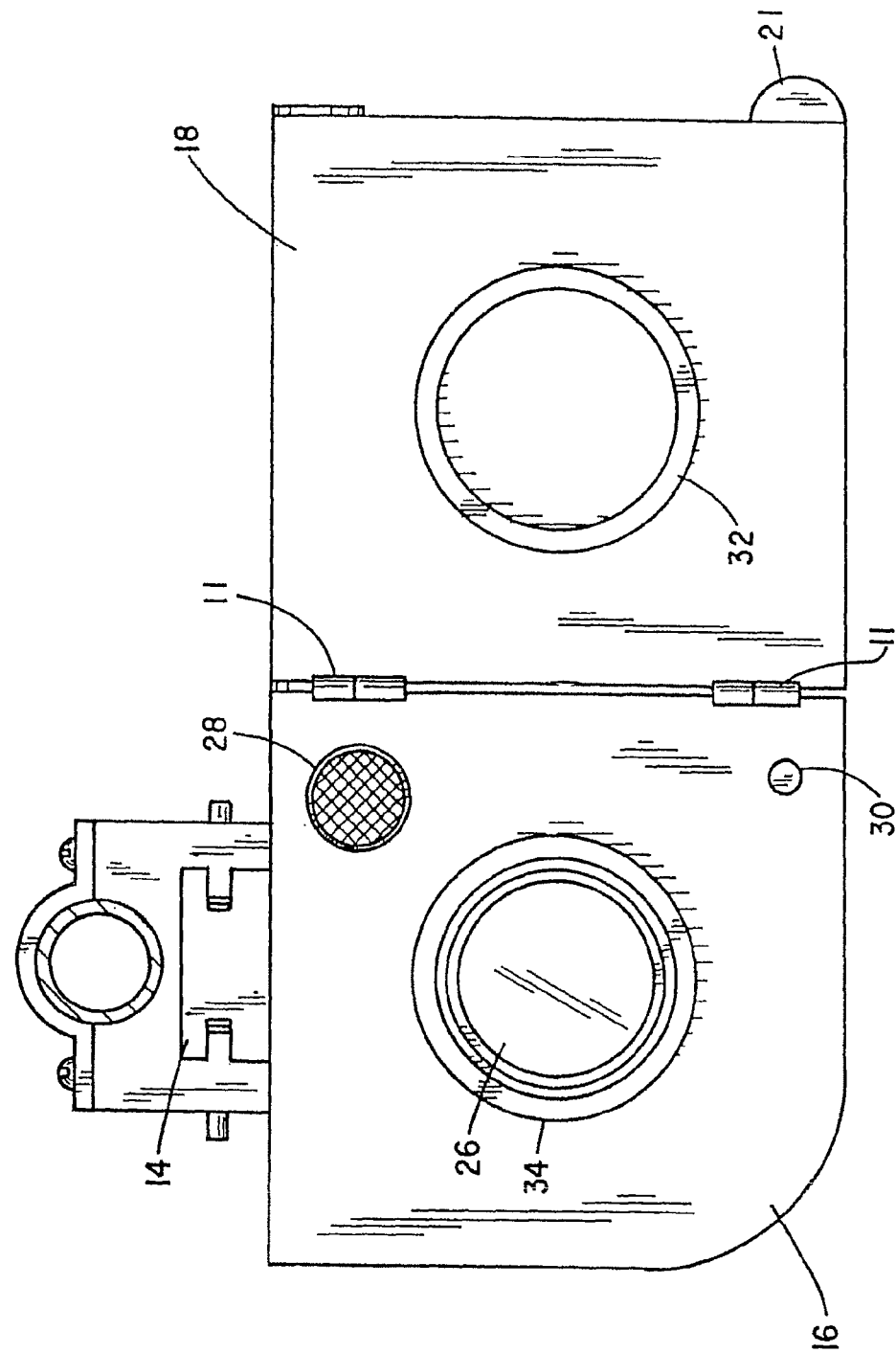
FIG. 3 is a front view of the first embodiment of the game hunting video camera in its operational mode.

A first embodiment of the game hunting video camera, in its non-operational mode, is illustrated in FIG. 1. The video camera is shown having a main camera body 10, a camera weather cover 12, a camera base 16, a liquid crystal display housing member 18, a liquid crystal display weather shield 20, a camera mount member 14, a zoom in button 22 and a zoom out button 24. The video camera in its operational mode is illustrated in FIG. 2. FIG. 3 illustrates the front side of the camera base 16. The front side of the camera base 16 contains the lens 26 of the camera, a circular recess portion 34, a front facing microphone 28 for recording the sounds produced by the game and normally closed SPDT push button camera record switch 30 that turns the video camera on and off.

A liquid crystal display housing member 18 is attached by hinges 11 to the camera base 16. When the video camera is in its non-operational transportation mode, the liquid crystal display housing member 18 is rotated on its hinges 11 so it is in front of the camera base 10 as illustrated in FIG. 1. When the liquid crystal display housing member 18 is in this position the normally closed camera record switch 30 is open and the video camera is off. The liquid crystal display housing member 18 is held in this position by a protruding circular semi pliable seal 32 that has one side solidly connected to the liquid crystal display housing member 18 as illustrated in FIG. 3. The other side of the circular semi pliable seal 32 is tightly received in the circular recess 34 located in front of the camera base 16. This seal connection not only keeps the liquid crystal display housing member 18 in the non-operational position, it also protects the lens 26 when the video camera is turned off. This is an important feature because the video camera is likely to be exposed to harsh environments as a hunter pursues his or her game. My design not only protects the lens 26 from scratches, as the hunter makes his or her way through the woods or brush, it also protects the lens from weather conditions.

When the hunter sees game he or she simply rotates the liquid crystal display housing member 18 about its hinges 11. This action closes the camera record switch 30 completing the circuit that starts the video camera recording. The ease and speed in which the video camera is started is very important in a hunting situation because a hunter may not have much time to react when the game is sighted. My design minimizes the time needed to get the video camera recording. In addition, the hinges 11 are tightly bound so that the liquid crystal display housing member 18 is put in a position by the operator it will stay there until the operator once again acts upon it.

Figure 4:
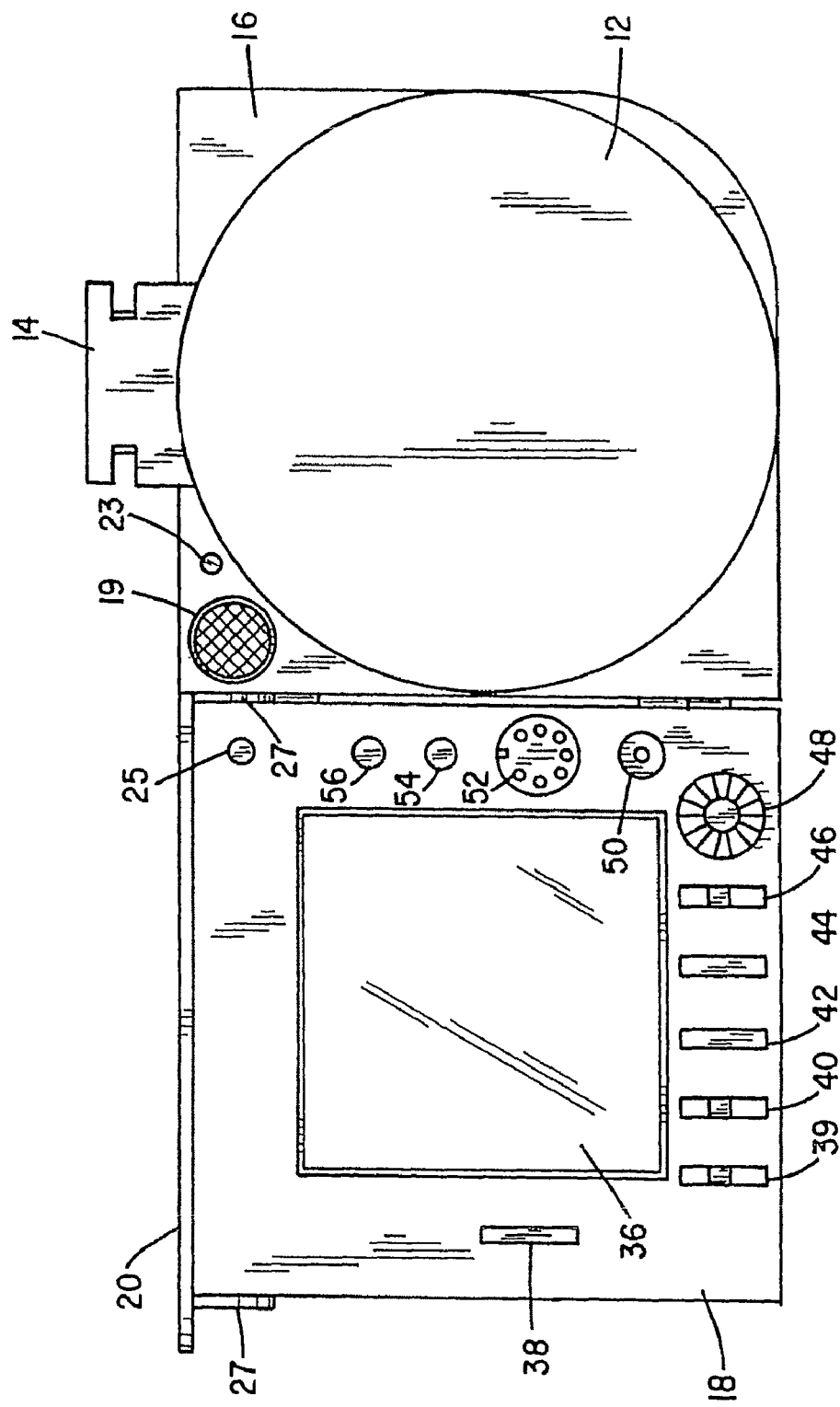
FIG. 4 is a rear view of the first embodiment of the game hunting camera in its operational mode.

The back side of the camera base 16 and the liquid crystal display housing member 18 is illustrated in FIG. 4. A rear microphone 19 is placed on the back side of the camera base 16 for recording the sounds produced by the hunter. The back side of the camera base 16 also has an indicator light 23 that lights up when the video camera is recording. A liquid crystal display 36 is encased in the back side of the liquid crystal display housing member 18. The operation controls of the camera are also placed in the back side of the liquid crystal display housing member 18 around the liquid crystal display 36. The operating controls are common in the art of video cameras and may include the following: a menu control 38, a liquid crystal display brightness control 39, a speaker control 40, an on/off record switch 42, a play control 44, a search control 46, a menu select dial 48, a battery charge connect port 50, a s-video terminal 52, a audio out port 54 and a video out port 56.

A weather shield is connected by pivots 27 on the back side of the liquid crystal display housing member 18 as illustrated in FIG. 4. The liquid crystal display 36 is activated when the liquid crystal display weather shield 20 is rotated in an upward direction. This action closes the normally closed SPST push button liquid crystal. display switch 25 activating the liquid crystal display 36. Besides controlling the liquid crystal display switch 25 the liquid crystal display weather shields also shields the liquid crystal display 36 from the weather. In addition, the liquid crystal display weather shield 20 has a liquid crystal display weather shield tab portion 21 that protrudes out beyond the body of the liquid crystal display housing member 18 as illustrated in FIG. 3. This tab portion allows the hunter to quickly flip the liquid crystal display weather shield 20 up to activate the liquid crystal display 36. The pivots 27 are also tightly bound so that when the operator puts the weather shield in a position it will remain there until the operator once again acts upon it.

Figure 7:
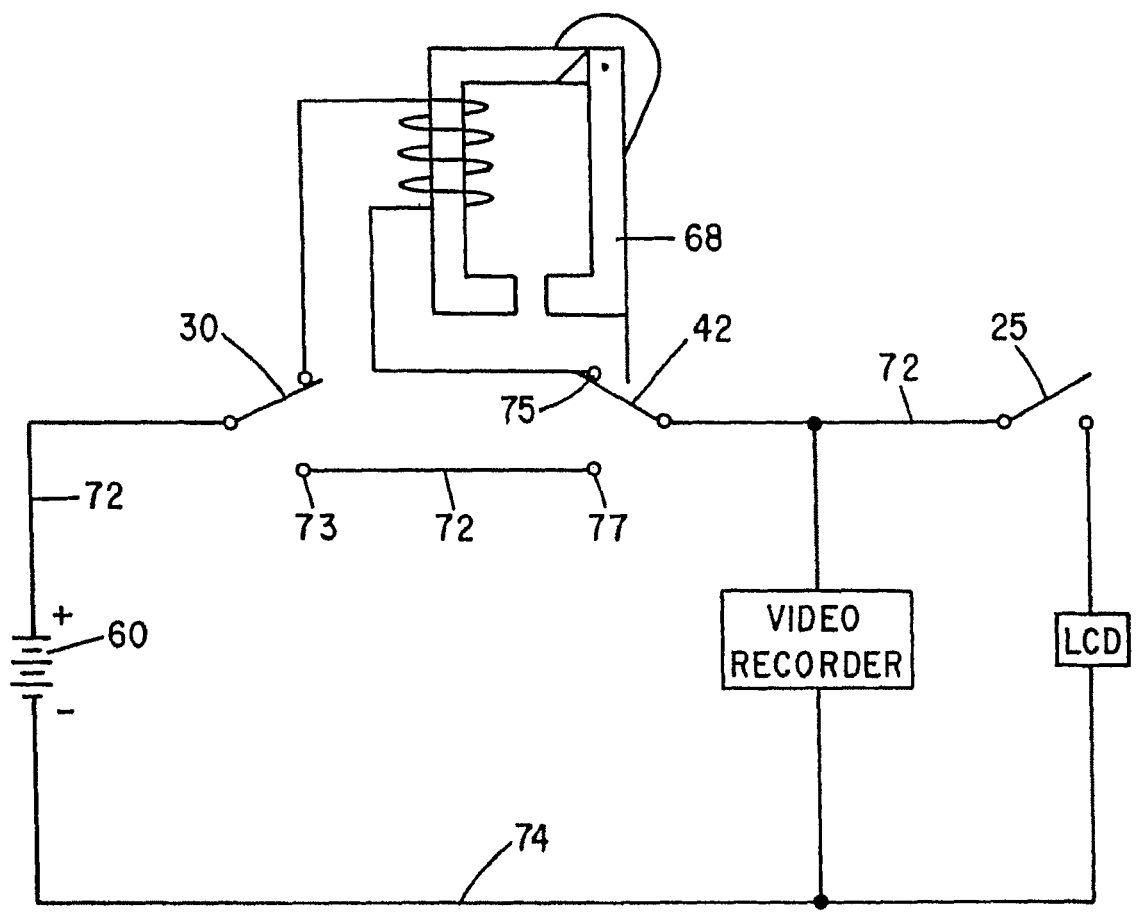
FIG. 7 is a schematic diagram of the circuit that controls the video recorder and the liquid crystal display in the first embodiment of the game hunting video camera.

The circuit that turns the video recorder and the liquid crystal display 36 on and off is an important feature of my invention and is illustrated in FIG. 7. A simplified circuit is shown having a battery source 60, a video recorder portion, a liquid crystal display portion, a relay 68, the camera record switch 30, the on/off record switch 42, the liquid crystal display switch 25, an upper wire 72 and a lower wire 74. The circuit is shown, having the liquid crystal display housing member 18 rotated in front of, and attached to, the camera base 16. Accordingly, the normally closed camera recorder switch 30 is in its open position 71. The circuit is also shown having the on/off switch 42 in its open position 75. If this situation occurs, the relay 68 automatically acts on the on/off record switch 42 switching it to the closed position 77. This ensures that every time the liquid crystal display housing member is rotated to the camera's operational position, the camera starts recording automatically. The operator will not have to waste time manually pushing the on/off record switch 42 on the liquid crystal display housing member 18 to get it in the right position. When the camera recorder switch 30 is in its closed position 73 and the on/off record switch 42 in its closed position 77, the circuit is complete and the video camera starts recording. The liquid crystal display 36 is turned on when the liquid crystal display switch 25 is closed. This occurs when the liquid crystal display weather shield 20 is flipped up.

Figure 5:
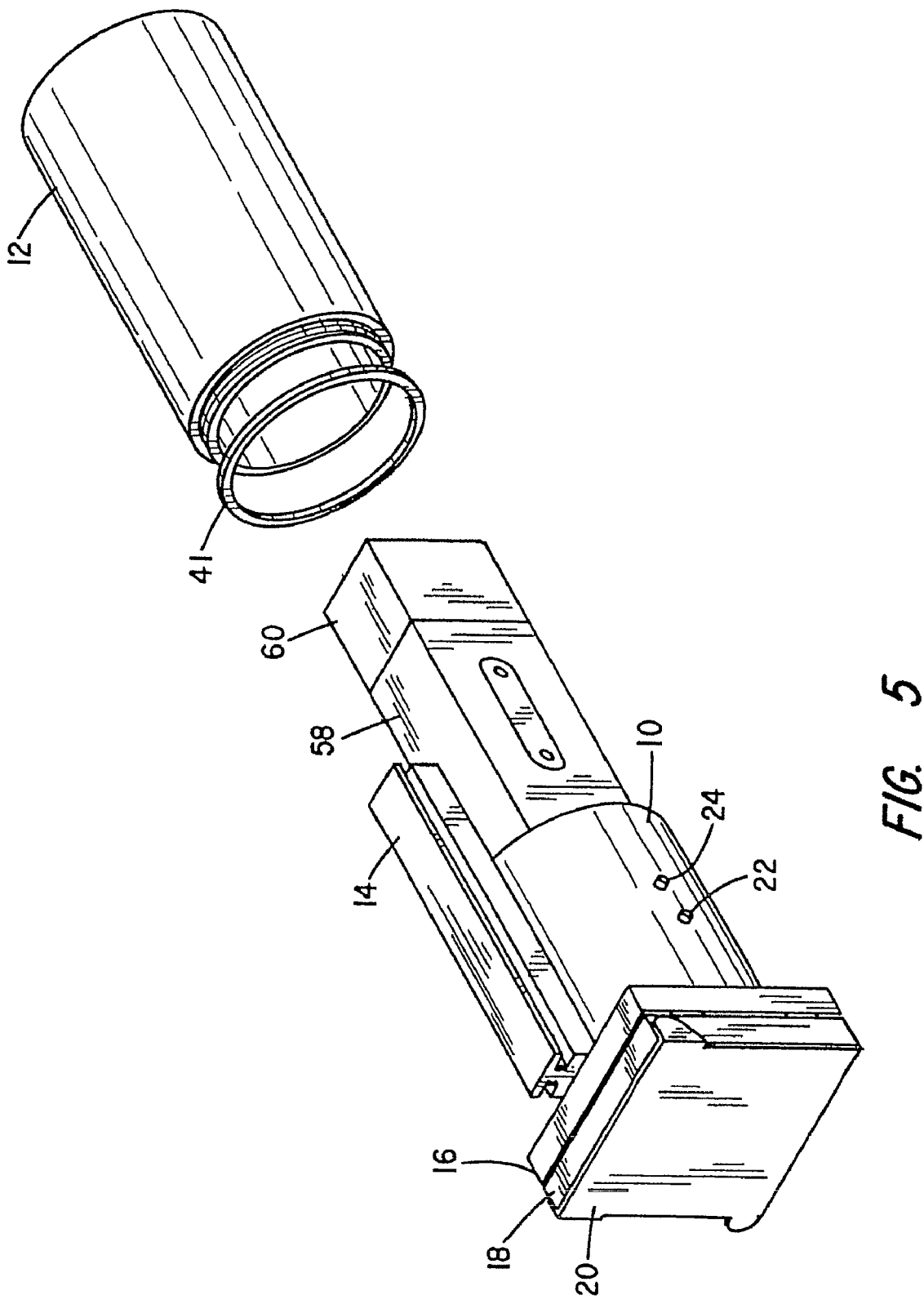
FIG. 5 is a perspective view of the first embodiment illustrating how the cassette drive and battery are accessed.
Figure 6:
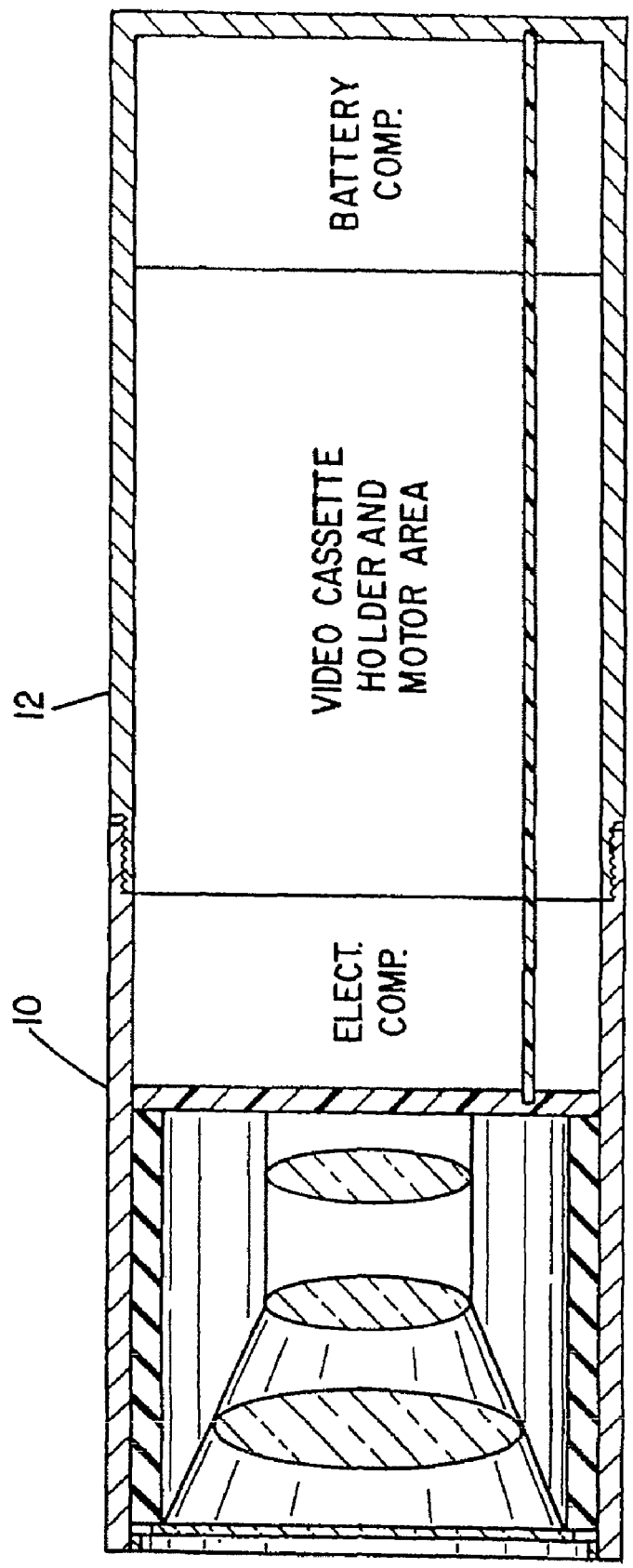
FIG. 6 is a side cross-sectional representation of the components of the game hunting video camera.

The video camera has a cylindrical weather cover 12 that screws onto the main camera base 10. This is illustrated in FIG. 5. As the weather cover 12 is screwed onto the main camera body 10 it comes in contact with a rubber ring 41 thereby sealing the internal components from the weather. The weather cover 12 also provides easy access to the cassette holder 58 and the battery 60. The operator simply has to unscrew the weather cover 12 to put in a video cassette or replace the battery 60. The main camera body 10 is also cylindrical in shape and houses the main components of a standard analog or digital video camera recorder known in the art. These components are illustrated in FIG. 6.

Figure 8:
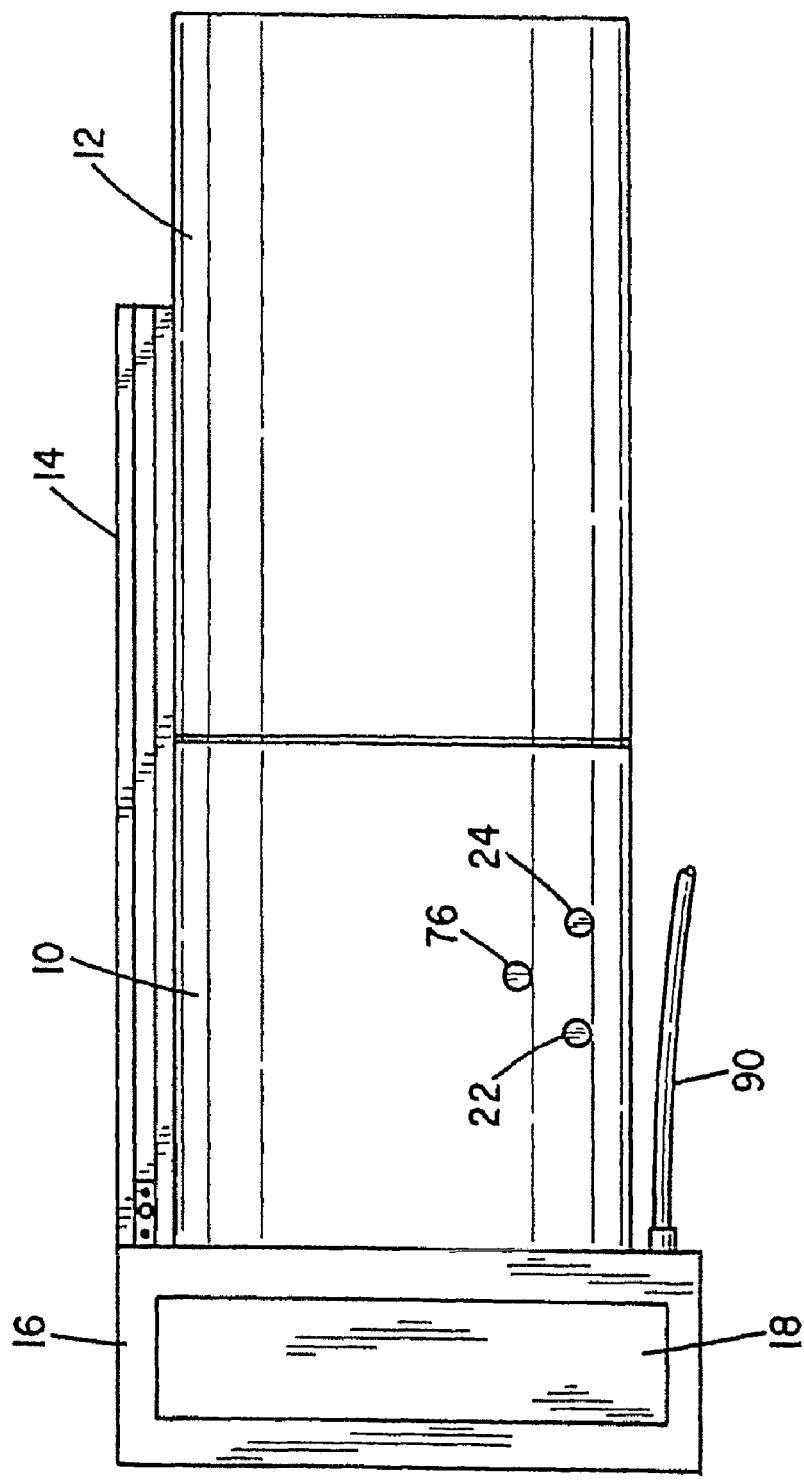
FIG. 8 is a side view of the second embodiment of the game hunting video camera in its non-operation mode.
Figure 9:
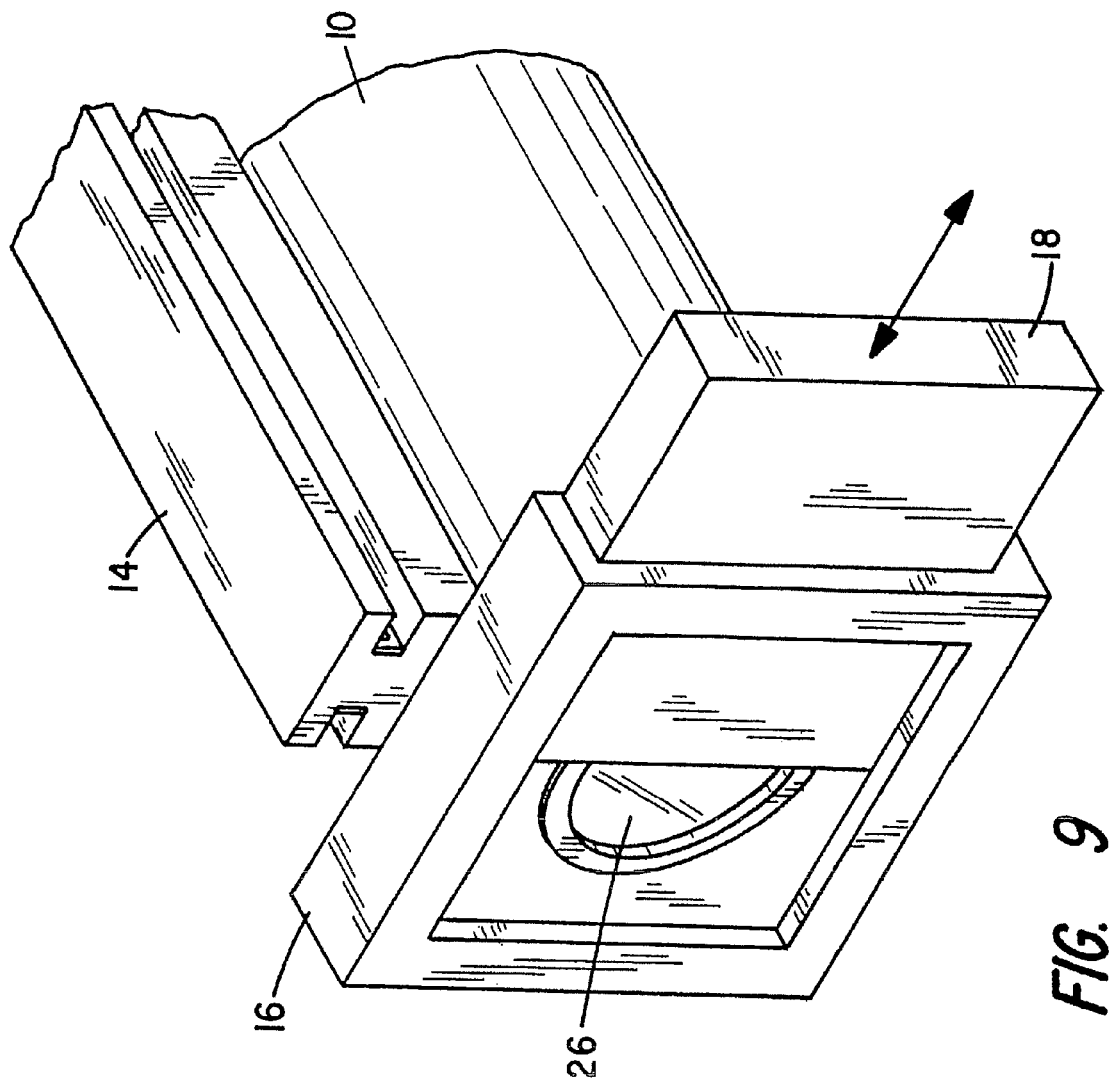
FIG. 9 is a perspective view of the second embodiment of the game hunting video camera illustrating how the LCD housing member moves.
Figure 10:
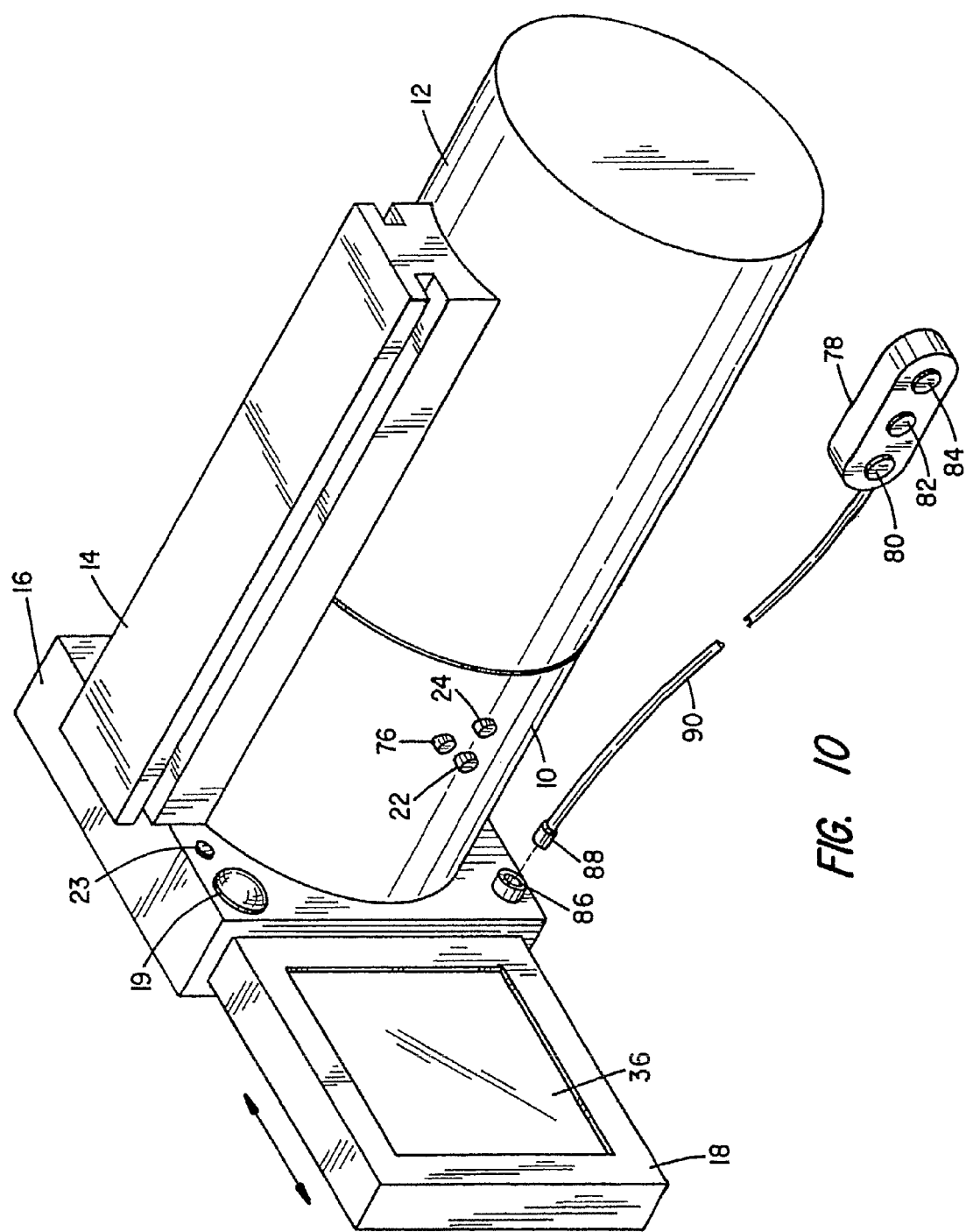
FIG. 10 is a perspective view of the second embodiment of the game hunting video camera in its operational mode.

A second embodiment is illustrated in FIG. 8. Instead of the operator manually moving the liquid crystal display housing member 18 and the liquid crystal display weather shield 20 to activate the video recorder and the liquid crystal display 36 respectively, this embodiment uses electronic switches. FIG. 8 illustrates the video camera in the non-operational mode. In addition to the zoom in button 22 and the zoom out button 24, the main camera body 10 also has an on/off button 76. When the on/off button 76 is activated the liquid crystal display housing member 18 slides out from the camera base 16 as illustrated in FIG. 9. As in the first embodiment, the liquid crystal display housing member 18 covers and protects the lens 26 when the camera is in its non-operational mode. When the liquid crystal display housing member 18 is fully extended, as illustrated in FIG. 10, the camera automatically starts recording and the liquid crystal display 36 is activated.

This embodiment has a remote port hookup 86 on the camera base 16. A remote pad 78 having a zoom in the button 80, a zoom out button 82 and an on/off button 84 can be attached to the remote port hookup 86, the remote pad 78 becomes operational. This design allows the operator to place the camera controls in a convenient location for optimal efficiency, like the forearm 100 of a firearm or the riser 104 of a bow.

Figure 11:
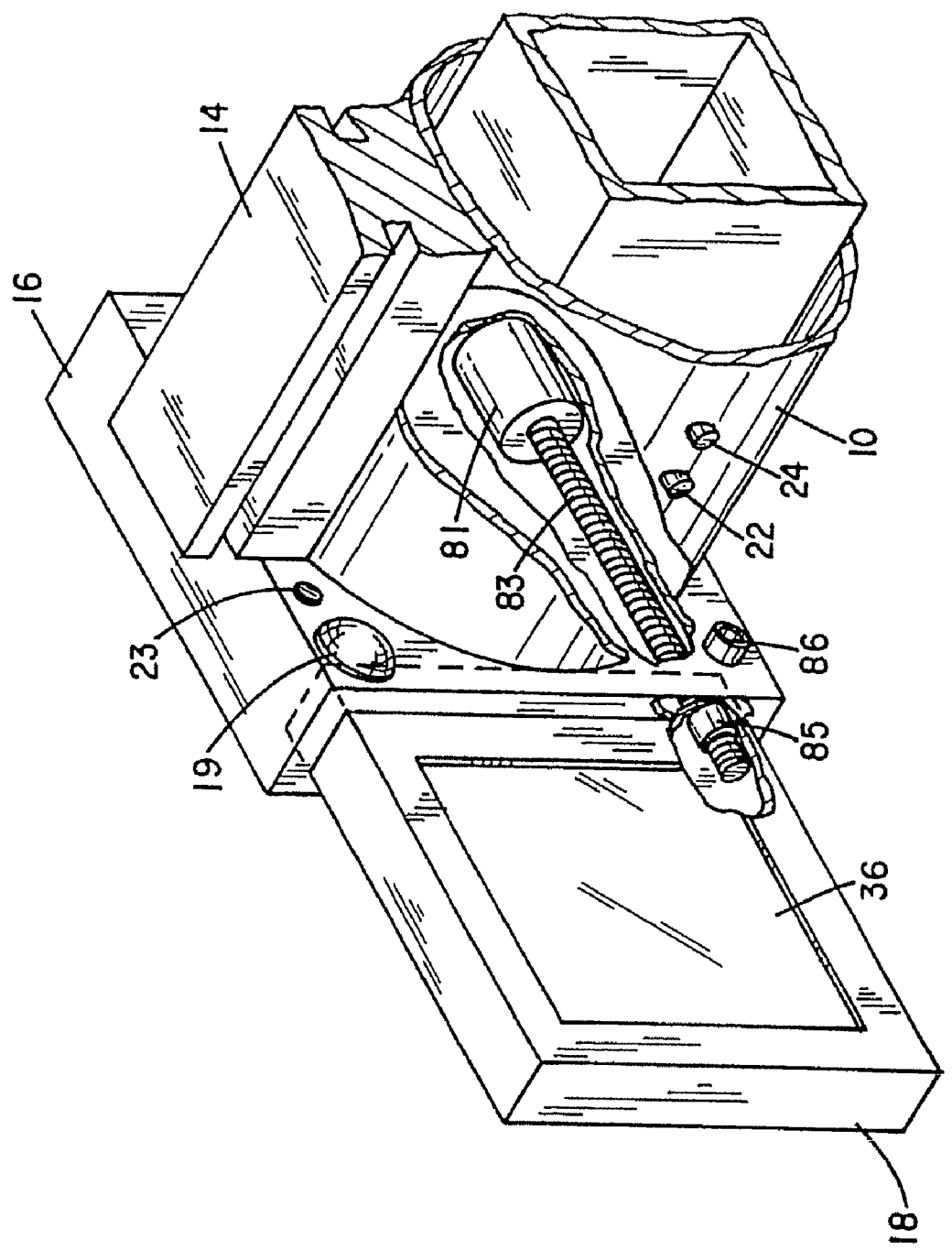
FIG. 11 is a perspective cross-sectional view of the second embodiment of the game hunting video camera illustrating the mechanism that controls LCD housing member.
Figure 12:
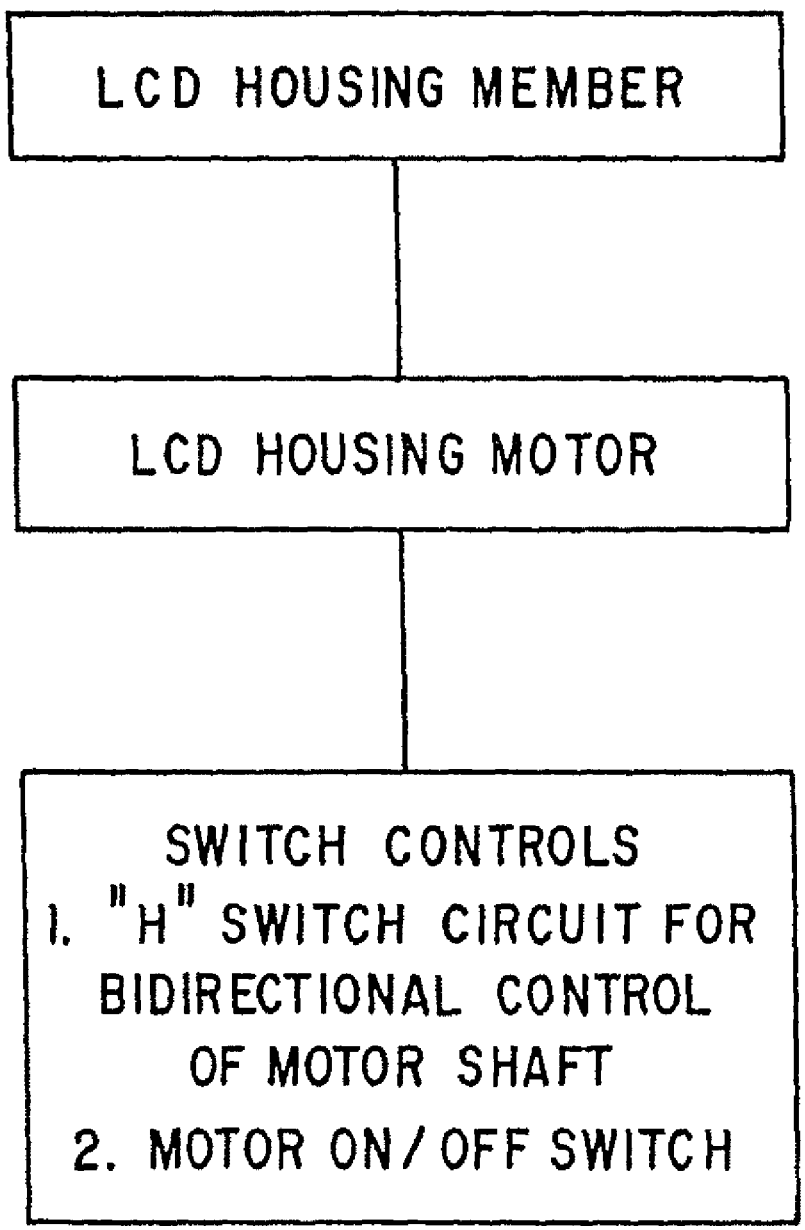
FIG. 12 is a block diagram of the mechanism that controls the movement of the LCD housing member for the second embodiment of the game hunting video camera.

Although, there are equivalent ways, common in the art, to control the movement of the liquid crystal display housing member 18, my preferred method is illustrated in FIG. 11. The liquid crystal display housing motor 81 has threaded shaft 83. The liquid crystal display housing member 18 has an internally threaded insert 85 that is threadably engaged with the threaded shaft 83 of the liquid crystal display housing motor 81. An "H" switch circuit controls the direction that the threaded shaft rotates. When the threaded shaft 83 rotates clockwise the liquid crystal display housing member 18 sides into the camera base 16. When the threaded shaft 83 rotates counter clockwise the liquid crystal display housing member 18 sides out of the camera base 16. The use of this system is common in the art and an example of an "H" switch circuit can be found in U.S. Pat. No. 4,454,454 issued to Valentine entitled Mosfet "H" Switch Circuit for a DC motor. In addition, a block diagram of the system is illustrated in FIG. 12.

Figure 13:
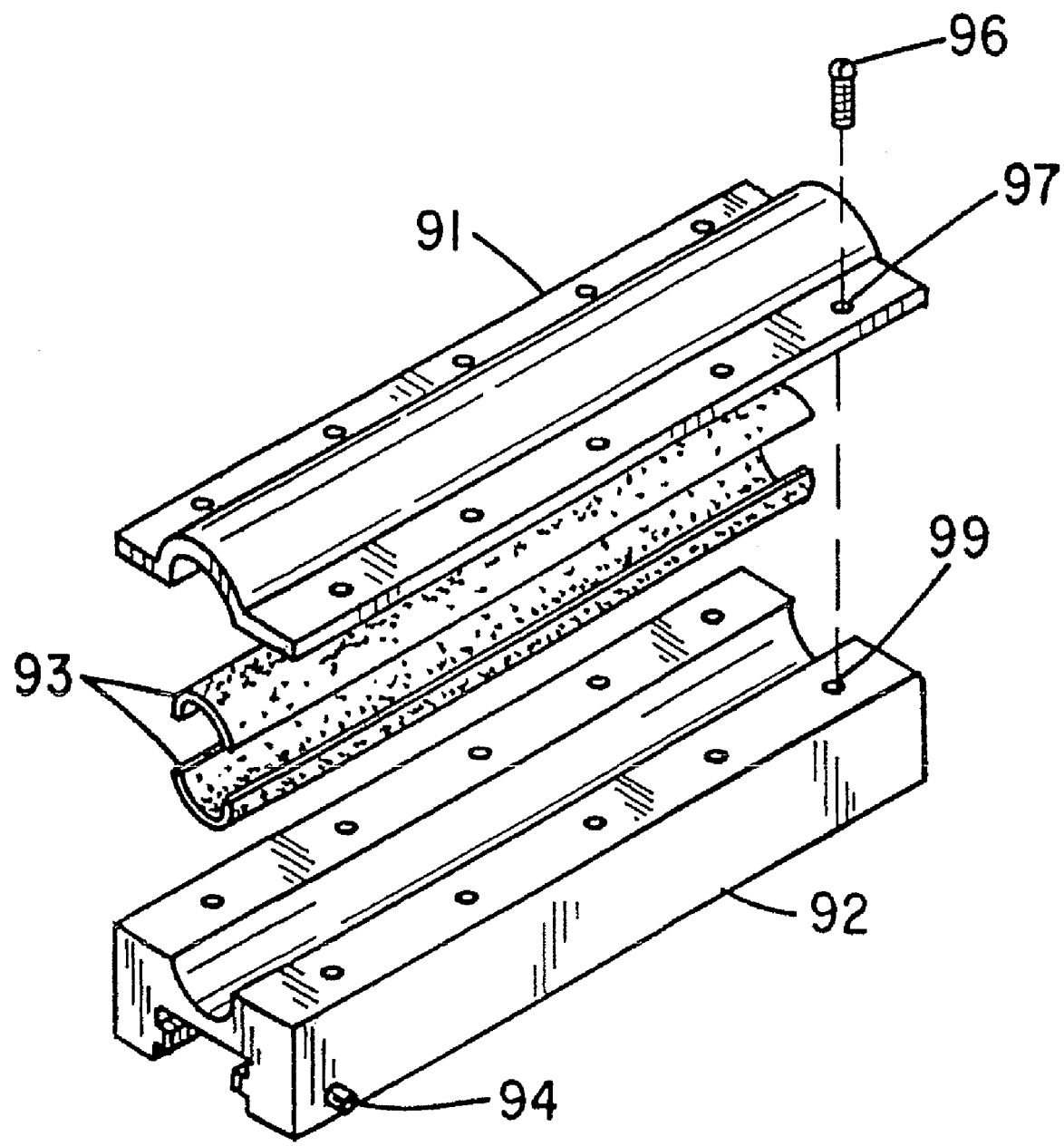
FIG. 13 is an exploded view illustrating the bracket mount system.

A bracket that mounts to a weapon is illustrated in FIG. 13. The upper mount member 91 has a number of screw holes 97.

Figure 14:
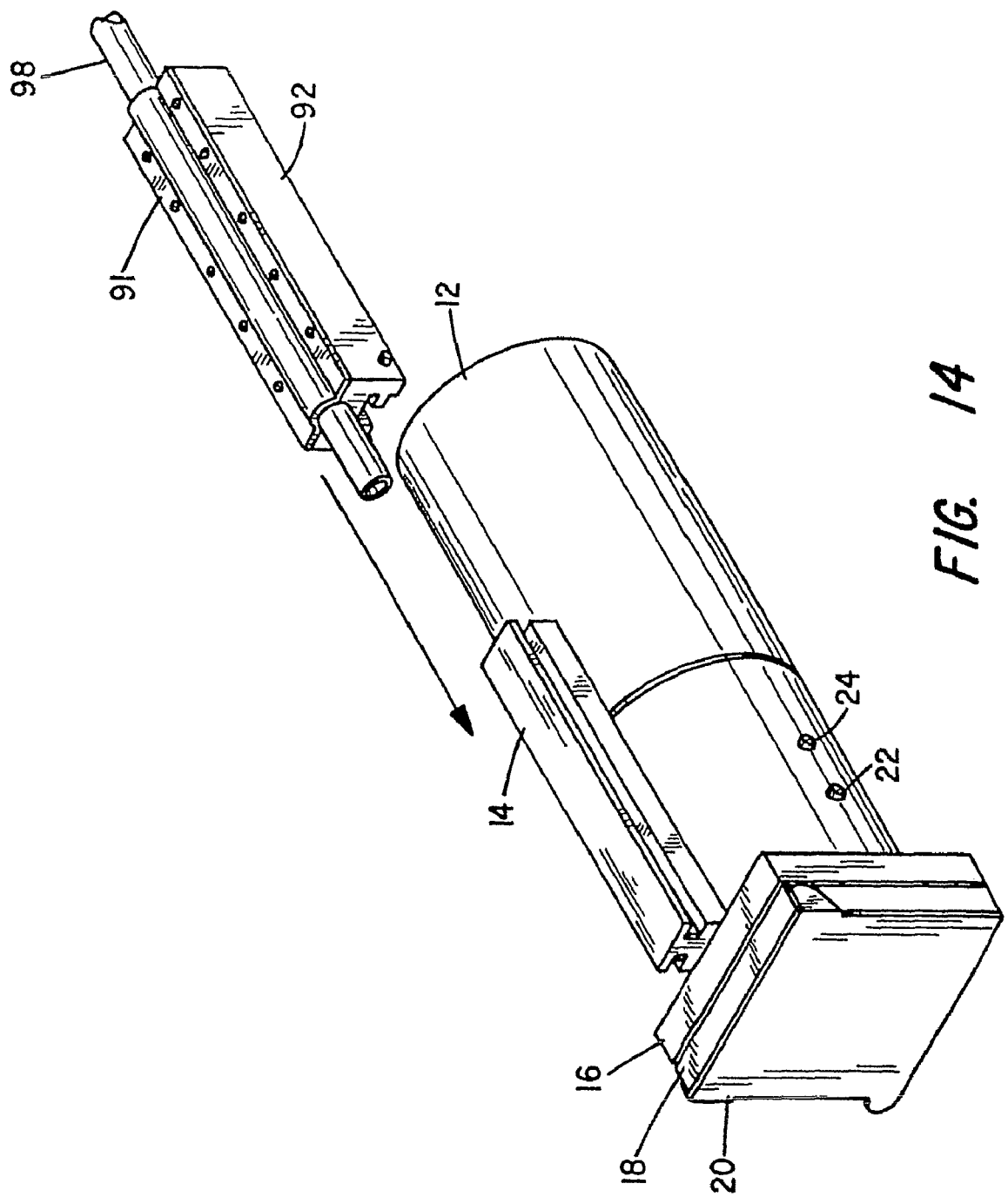
FIG. 14 is a perspective view illustrating how the video camera is mounted on a barrel of a firearm.

The lower mount member 92 has the same number of threaded screw holes 99. A foam rubber insert 93 covers the inner surface of the upper mount member 91 and the inner surface of the lower mount member 92 to protect the surface of what the mounting bracket is being mounted to. The bracket mounted to a barrel 98 of a firearm is illustrated in FIG. 14. The upper mount member 91 is placed over the top of the barrel 98 of the firearm. The lower mount member 92 is placed under the barrel 98. The screw holes 97 in the upper mount member 91 are then lined up with the threaded screw holes 99 in the lower mount member 92, securing the mounting bracket to the weapon. In addition, the thickness of the foam rubber insert 93 can be changed to accommodate different size barrels 98.

Figure 15:
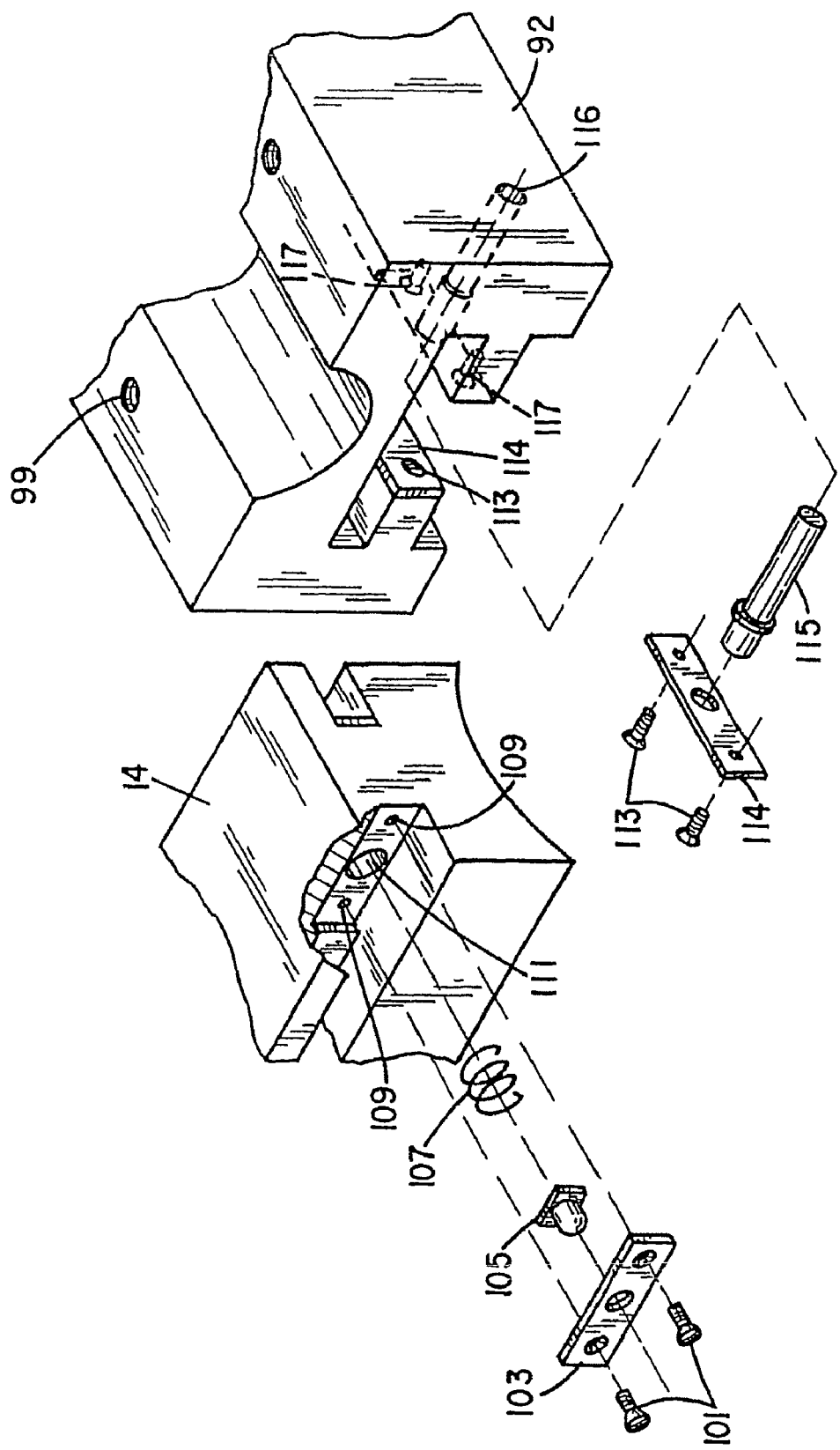
FIG. 15 is an exploded cross-sectional view of the components of the mount system.
Figure 16:
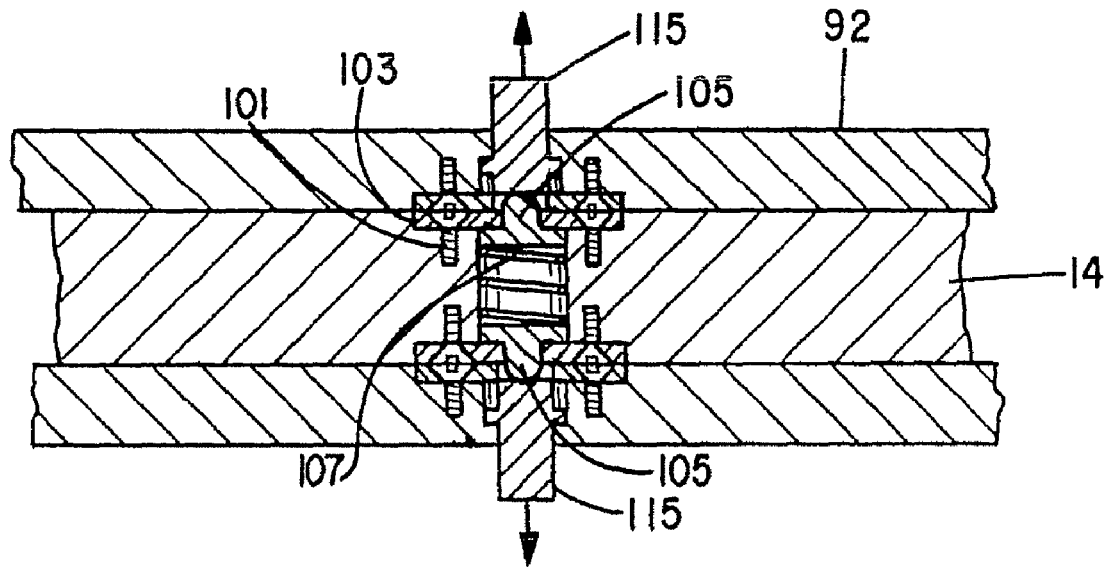
FIG. 16 is a bottom cross-sectional view of the mount system locked in place.
Figure 17:
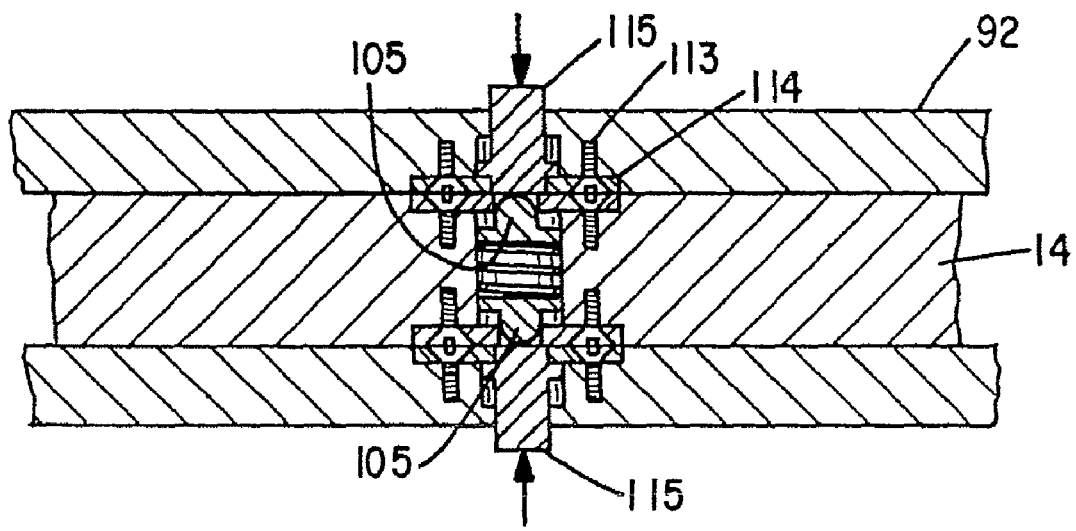
FIG. 17 is a bottom cross-sectional view of the mount system being released by the quick release buttons.

As FIG. 14. illustrates, the video camera is attached to the mounting bracket by sliding the camera mount member 14 into the track of the lower mount member 92. When the camera mount member 14 is positioned far enough into the track of the lower mount member 92 it is locked into place. This is to ensure that the camera will not inadvertently fall off the weapon. The mechanism that locks the camera into place is illustrated in FIGS. 15, 16 & 17. A pair of biasing springs 107 are inserted into cavities 111 in the camera mount member 14. A pair of fastening buttons 105 are then inserted into the cavities 111 engaging the biasing springs 107. The fastening buttons 105 are held in place by a pair of camera mount member plates 103. The camera mount member plates 103 have circular holes that allow the fastening buttons 105 to protrude through them from the force of the biasing spring 107. The camera mount member plates 103 are secured by the camera mount plate screws 101 being screwed into the threaded holes 109 in the camera mount member 14.

A pair of release push buttons 115 are inserted into the push button cavities 116 in the lower mount member 92. The release push buttons 115 are held in place by the mount member plates 114. The mount member plates 114 are secured to the lower mount member 92 by the mount member plates screws 113 being screwed into the threaded screw holes 117. The mount member plates 114 have circular holes in them that are large enough for the fastening buttons 105 to fit through.

FIG. 16 illustrates how the camera mount member 14 locks into place with the lower mount member 92. As the camera mount member 14 slides along the track in the lower mount member 92, the biasing springs 107 assert an outward pressure on the fasting buttons 105. When the fasting buttons 105 encounter the holes in the mount member plates 114 they are forced into them. This action locks the video camera on the mount system. To remove the camera the operator simply presses in on the release push buttons 115. This action forces the fastening buttons 105 out of the holes in the mount member plates 114. This illustrated in FIG. 17. The camera will then slide off the mount effortlessly. Having this simple method of removing the camera is important to the invention because it allows, without undue delay, the use of the camera without it being attached to a weapon.

Figure 18:
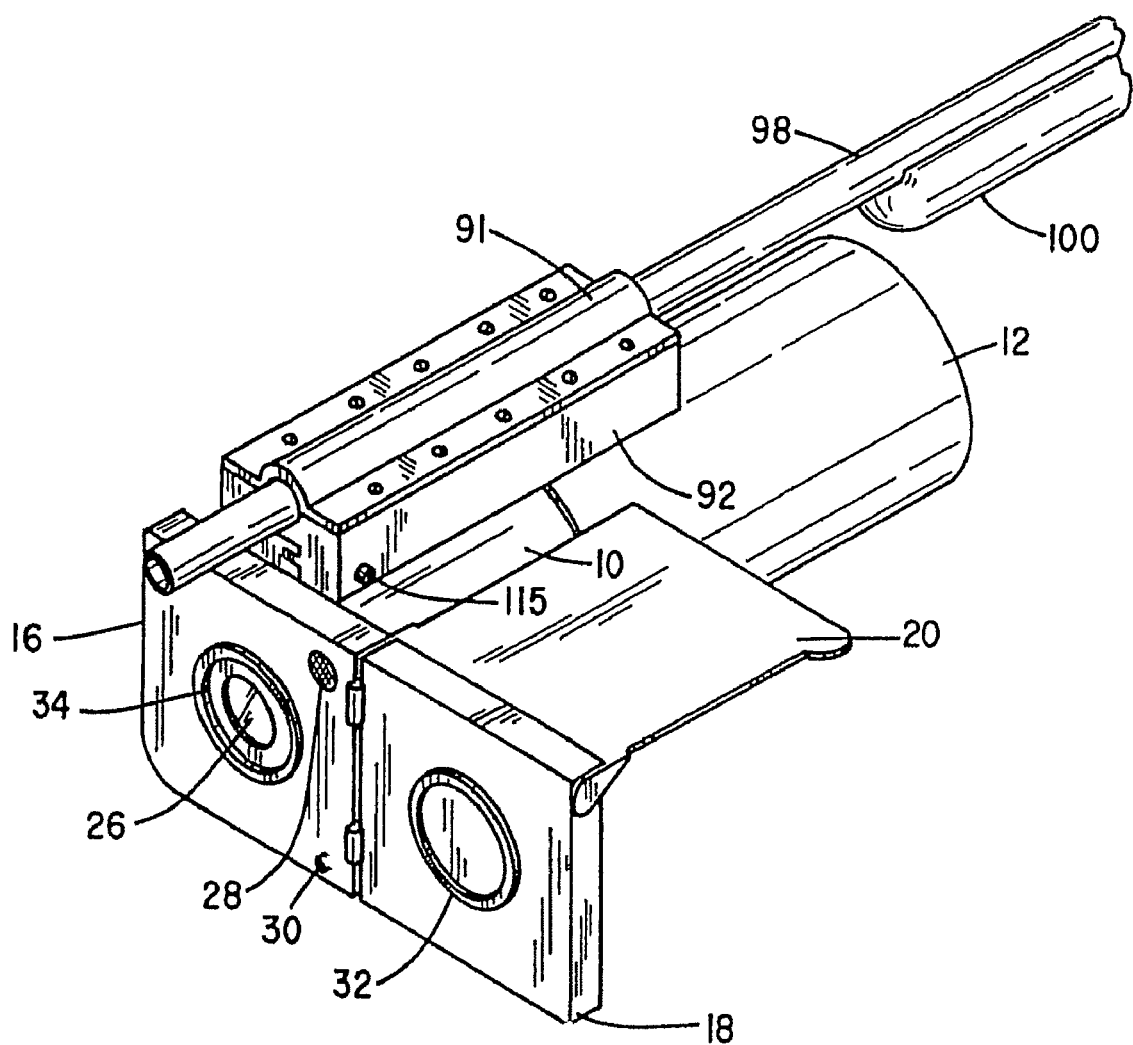
FIG. 18 is a perspective view of the first embodiment of the game hunting video camera mounted on a barrel of a firearm.

The first embodiment of the video camera mounted to the barrel 98 of a firearm is illustrated in FIG. 18. The firearm is shown having a barrel 98 and a forearm 100. One reason for the cylindrical design of the camera body is so it is natural for the operator to use the body of the video camera as he or she would the forearm 100 of the firearm. If the operator does this, his or her thumb will be in a natural position to operate the zoom in button 22 and the zoom out button 24 with little effort or movement. In addition, the remote pad 78 in my second embodiment can be attached to the forearm 100 of the firearm by Velcro, or by some similar fashion, for ease of operation.

Figure 19:
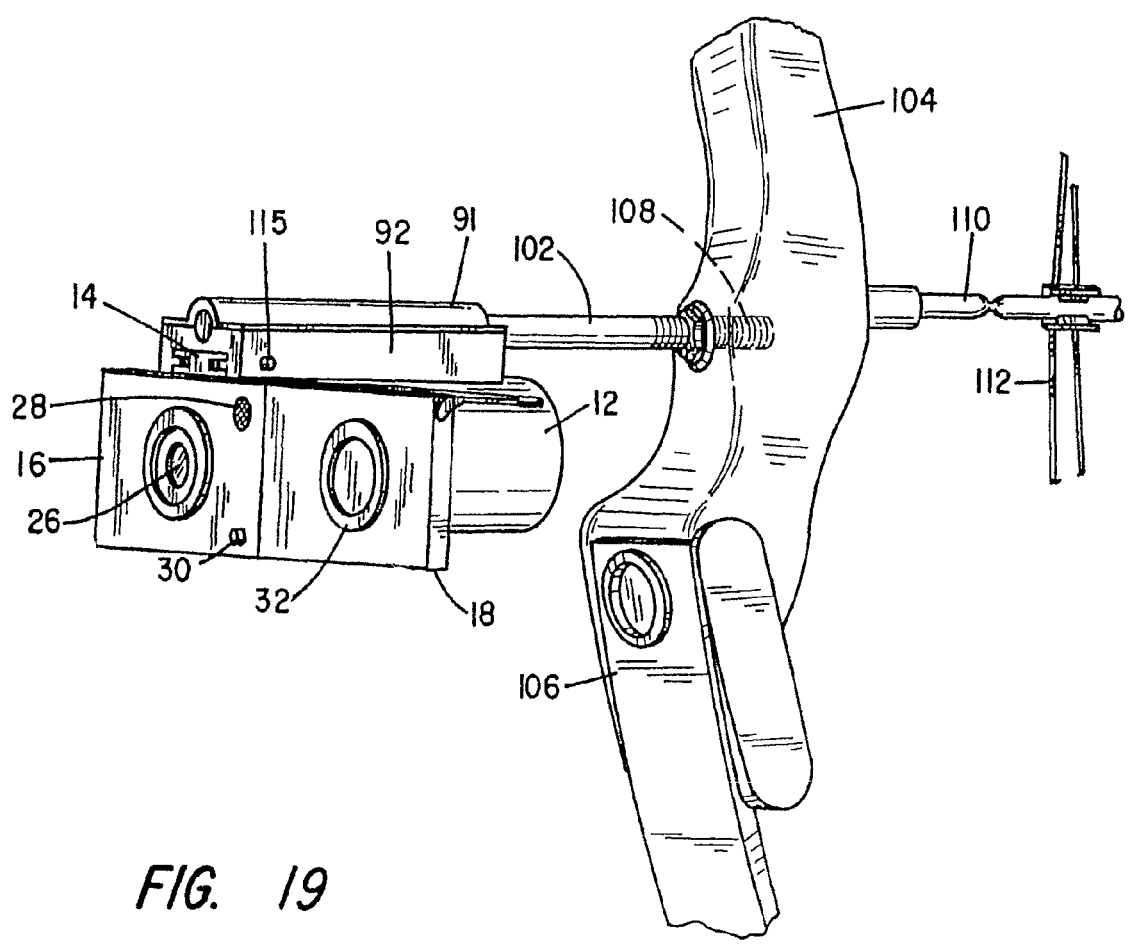
FIG. 19 is a perspective view of the first embodiment of the game hunting video camera mounted on a bow.

The first embodiment of the video camera mounted to a bow is illustrated in FIG. 19. The bow is shown having a riser 104, a flexible bow element 106, a cable guard 110, bow string 112, an internally threaded metal insert 108 is shown having the counter weight bar 102 threadably attached. A counter weight bar 102 is used to stabilize the bow when the bow string 112 is drawn back. The mounting bracket is attached to the counter weight bar 102 the same way it is attached to the barrel 98 of a firearm. In addition, the thickness of the foam rubber insert 93 in the mounting bracket can be changed to accommodate the diameter of the counter weight bar 102. Moreover, the remote pad 78 in my second embodiment can be attached to the riser 104 of the bow by Velcro, or by some similar fashion, for ease of operation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A camera for mounting to a weapon, the camera comprising:
    a housing;
    a camera lens located at a front end of the housing;
    a video recorder located within the housing for recording images captured by the camera lens;
    a cover coupled to a rear end of the housing for accessing components located within the housing;
    a display attached to the housing; and
    a mounting rail extending parallel to the housing.

2. The camera of claim 1, further comprising:
    a battery compartment located within the housing and electrically connected to the video recorder.

3. The camera of claim 2, further comprising:
    a battery located in the battery compartment for providing power to the video recorder.

4. The camera of claim 1, further comprising:
    buttons located on the housing for controlling operation of the video recorder.

5. The camera of claim 1, further comprising:
    a microphone attached to the housing.

6. The camera of claim 1, further comprising:
    at least one port for connecting the video recorder to an external device.

7. The camera of claim 1, wherein the video recorder comprises a digital video recorder.

8. The camera of claim 1, wherein the housing is plastic.

9. The camera of claim 1, wherein at least a portion of the housing is cylindrical.

10. A camera comprising:
    a camera body having a lens at front end and a cover at the rear end;
    a video recorder located within the camera body between the front and rear ends;
    at least one port for connecting the video recorder to an external device;
    a battery compartment connected to the video recorder; and
    a mounting rail extending parallel to the camera body.

11. The camera of claim 10, wherein the cover is at least partially detachable from the rear end of the camera body.

12. The camera of claim 11, wherein at least one of the video recorder and the battery compartment are accessible when the cover is detached from the rear end of the camera body.

13. The camera of claim 10, further comprising:
a battery located in the battery compartment for providing electrical power to video recorder.

14. The camera of claim 10, further comprising:
buttons located on an exterior surface of the camera body for controlling the video recorder.

15. The camera of claim 10, further comprising:
a microphone connected to the video recorder.

16. The camera of claim 10, further comprising:
a display attached to the camera body.

17. The camera of claim 10, wherein the camera body is plastic.

18. The camera of claim 10, wherein at least a portion of the camera is cylindrical.

19. A camera for mounting to a weapon, the camera comprising:
a housing;
a camera lens located at a front end of the housing;
a video recorder located within the housing for recording images captured by the camera lens;
a cover coupled to a rear end of the housing for accessing components located within the housing;
at least one port for connecting the video recorder to an external device; and
a mounting rail extending parallel to the housing for mounting the camera to a weapon.

20. A camera comprising:
a camera body having a lens at front end and a cover at the rear end;
a video recorder located within the camera body between the front and rear ends;
a battery compartment connected to the video recorder;
a display attached to the camera body; and
a mounting rail extending parallel to the camera body for mounting the camera to a weapon.

* * * * *